Sept. 8, 1970   C. P. TRESSELT   3,528,038
TAPERED LINE DIRECTIONAL COUPLER
Filed July 11, 1969   3 Sheets-Sheet 3
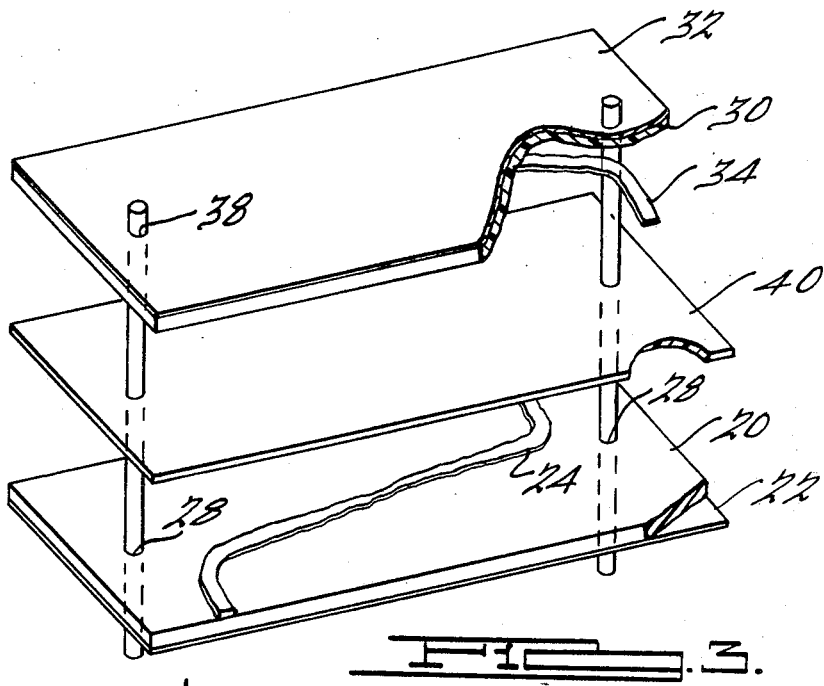
FIG. 3.
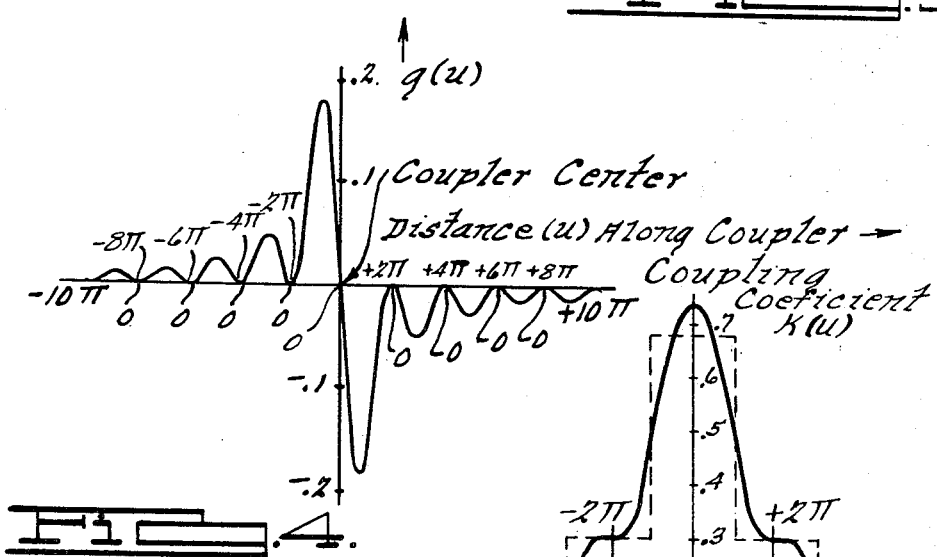
FIG. 4.
FIG. 5.
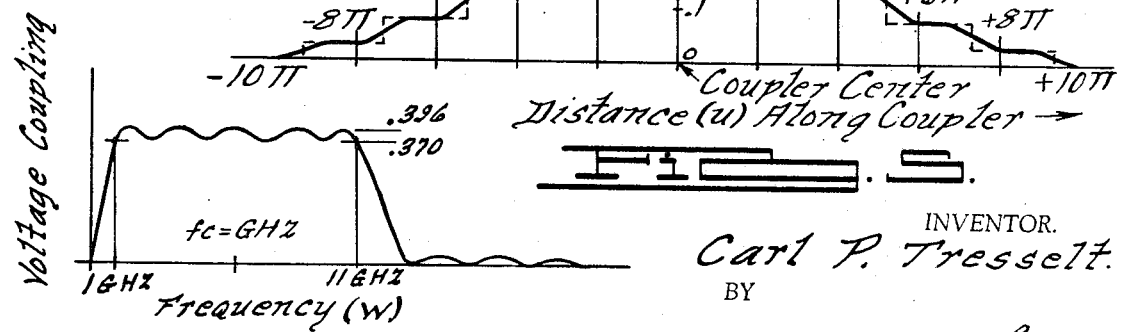
FIG. 6.
INVENTOR.
Carl P. Tresselt.
BY
Richard J. Sager
ATTORNEY.

ing to the coupler, which in the normalized units being used is equal to one ohm. For this example, then, $$M_1 = \frac{1}{2} \ln \frac{2.25315}{1.35771} = 0.2533$$

Similarly, $M_2 = 0.2303$, $M_3 = 0.1954$, $M_4 = 0.1517$ and $M_5 = .1388$.

The first-order solution for constant coupling in a tapered line directional coupler is given by the relationship $$g(u) = \frac{d}{du} \ln Z_{oe}(u) = -\frac{\sin^2 u/2}{u/2}$$

where $u$ is the distance along the coupler. The function $g(u)$ over the interval $-2\pi < u < 2\pi$ is multiplied by $M_1$; over the interval $-4\pi \leq u \leq -2\pi$ and $2\pi \leq u \leq 4\pi$ is multiplied by $M_2$; over the interval $-6\pi \leq u \leq -4\pi$ and $4\pi \leq u \leq 6\pi$ is multiplied by $M_3$ and so forth until $$M_{\frac{n+1}{2}}$$

has been applied to $g(u)$ over the ranges $$-(n+1)\pi \leq u \leq -(n-1)\pi \text{ and } (n-1)\pi \leq u \leq (n+1)\pi$$

All ordinates of $g(u)$ are set equal to zero for $$u < -(n+1)\pi \text{ and } u > (n+1)\pi$$

The results of this process for the example given above are shown in FIG. 4. It should be noted that the curve in FIG. 4 has periodic zeros occurring at points O where the curve comes in contact with the abscissa line.

Determination of the even-mode impedance, and hence the coupling vs. distance characteristics of the device, follows from the expression $$Z_{oe}(u) = \exp\left[\int_{-(n+1)\pi}^{+(n+1)\pi} M_i g(u) du\right]$$

which, for the explicit $g(u)$ function given, becomes:

$$Z_{oe}(u) = \exp\left[-\int_{-(n+1)\pi}^{+(n+1)\pi} M_i \frac{\sin^2 u/2 du}{u/2}\right]$$

Since the values $M_i$ are constant over the various regions $i$ in $u$, the basic integral to be performed is that of $$\int \frac{\sin^2 u/2 \, du}{u/2}$$

Fortunately, the integration can be found in tabular form by noting that $$\int \frac{\sin^2 u/2}{u/2} du = \int \frac{(1 - \cos u)}{u} du$$

$$= Cin(a) = C + \ln(a) - Ci(a)$$

where $Cin$ and $Ci$ are various definitions of the cosine integral found tabulated in numerous references including: R. W. P. King, "The Theory of Linear Antennas," Cambridge, Massachusetts, Harvard Universiay Press, 1956, pp. 857–864; "Tables of Sine, Cosine, and Exponential Integrals," Table III, Federal Works Administration, Works Progress Administration, New York, N.Y., 1940; and "Handbook of Mathematical Functions, U.S. Department of Commerce, NBS, Applied Mathematics, Series 55, Washington, D.C., U.S. Government Printing Office, June 1964, ch. 5. In the numerical example, the largest value of even-mode impedance occurs at $u=0$, a value which may be determined from the above integral expression for $Z_{oe}$ evaluated over the limits from $u=-10\pi$ to $u=0$:

$$Z_{oe}(o) = \exp\{-[M_5(Cin(-10\pi) - Cin(-8\pi))$$
$$+ M_4(Cin(-8\pi) - Cin(-6\pi))$$
$$+ M_3(Cin(-6\pi) - Cin(-4\pi))$$
$$+ M_2(Cin(-4\pi) - Cin(-2\pi))$$
$$+ M_1(Cin(-2\pi) - Cin(o))]\}$$
$$= \exp\{-[0.1388(-0.223)$$
$$+ 0.1517(-0.287) + 0.1954(0.402)$$
$$+ 0.2303(-0.676)$$
$$+ 0.2533(-2.438)]\} = \exp\{.926\} = 2.512$$

The physical coupling at the center is accordingly $$k(o) = \frac{Z_{oe}^2(o) - 1}{Z_{oe}^2(o) + 1} = .726$$

Coupling at the other points along the coupler are found in a similar manner. To achieve a reasonable definition of the coupler characteristic the coupling is computed at a minimum of at least six equally spaced points for each lobe of $g(u)$. The coupling coefficient vs. distance characteristic that results, $k(u)$, is shown plotted in FIG. 5.

The approximate frequency response of this coupler is shown in FIG. 6 for an overall coupled region length of 3.23 inches in polyolefin stripline. This length can be determined by utilizing the bandwidth data for the previously selected ninth-order stepped prototype design. The bandwidth ratio from the Cristal and Young article supra, for the ninth-order $-8.34 \pm 0.3$ db design, is approximately 11 to 1. This is the ratio of the high frequency limit to the low frequency limit of the equal ripple coupling band. In this embodiment the bandwidth chosen is between 1 gigahertz and 11 gigahertz. The length $d$ of the coupler then follows from the relationship:

$$d = \frac{(n+1)v}{4 f_c}$$

where $v$ is the TEM mode velocity of propagation in the medium of interest, which for polyolefin is $77.5 \times 10^8$ inches per second and $f_c$ is the arithmetic center frequency, which for a bandwidth of 1 to 11 gigahertz would be 6 gigahertz, and $n$ is the order of the coupler which for this embodiment is 9. Simple substitutions of 9 for $n$, $77.5 \times 10^8$ for $v$, and $6 \times 10^9$ for $f_c$ produces $d = 3.23$ inches.

The abscissa of FIG. 5, which is the length of the coupler, is marked between $-10\pi$ and $+10\pi$ to correspond with the ninth-order model of FIG. 4. The abscissa as marked is dimensionless and hence the coupling curve between $-10\pi$ and $+10\pi$ indicates the properties of the actual coupler proportionately along the length between $-d/2$ and $+d/2$. As above computed, the length $d$ in this embodiment is 3.23 inches, from which the other dimensions along the length of the coupler may be scaled proportionally.

In FIG. 5 the horizontal levels generally indicated at $2\pi$, $4\pi$, $6\pi$, etc., are connected by oblique or sloped portions which occur along a distance approximately equal to $\frac{1}{4}\lambda$, where $\lambda$ is the wavelength of a wave with a frequency at the center of the coupled frequency band. These generally oblique connecting portions are contrasted with a corresponding prior art curve for prior art couplers which is shown in dashed lines and is superimposed the curve of FIG. 5. In the prior art curve shown in dashed lines, the connecting portions between the horizontal levels are substantially vertical indicating the presence of discontinuities and resultant lower directivity.

Any coupler length $d$ may be chosen but the longer the coupler, the lower will be the frequencies in the frequency band covered and the shorter the coupler, the higher will be the frequencies in the frequency band covered. As the coupler length is varied, the high and low frequency in the frequency band remain in the same proportion.

The disclosed embodiment has a mean coupling of $-8.34$ db and a maximum ripple of $\pm.3$ db which corresponds to a mean coupling of .383 volts and a ripple tolerance of $\pm.013$ volt, as shown in FIG. 6. A more exact theoretical picture of the response, generated by a digital computer, may be found in FIG. 8 of the article "Design and Computed Theoretical Performance of Three Classes of Equal-Ripple Non-Uniform Line Couplers" by Applicant, IEEE Transactions on Microwave Theory and Techniques, April 1969, pp. 218–230.

Once the coupling coefficient vs. physical distance is known, the transverse dimensions of the coupled three-layer stripline embodiment can be determined from the article by J. Paul Shelton, Jr., "Impedances of Offset Parallel-Coupled Strip Transmission Lines," IEEE Transactions on Microwave Theory and Techniques, January 1966, pp. 7–15. The only part of the embodiment which does not follow the prescribed coupling curve exactly is in the outer circular bends which represent a convenient shape with which to bring coupling to zero. Conductor width is chosen to be the $Z_0=50$ ohm value in this region, the value of the radius of the bend being chosen to fair in smoothly with the theoretical data near the middle of the last lobe of $g(u)$ (at about $\pm 9\pi$ in FIGS. 4 and 5). The centers of the radii were located such that the inner edge of the smaller radius occurs at about the theoretical value of $-d/2$ as shown in FIG. 1. Exact shape is not critical in these regions. For a representative embodiment of this invention as shown in FIG. 1, dimensions of the circular bends defining the ends of the coupling regions are given on the drawings. The following chart defines the widths W of the conductors and the transverse distances TD from the centerline of the conductor of this embodiment in inches:

| X | TD | W |
|---|---|---|
| 1.392 | .0970 | .102 |
| 1.340 | .0900 | .102 |
| 1.296 | .0900 | .102 |
| 1.238 | .0872 | .102 |
| 1.187 | .0804 | .1015 |
| 1.133 | .0678 | .1010 |
| 1.082 | .0588 | .1008 |
| 1.031 | .0534 | .1003 |
| .980 | .0530 | .1003 |
| .972 | .0530 | .1003 |
| .928 | .0528 | .1003 |
| .877 | .0480 | .1000 |
| .825 | .0392 | .0990 |
| .773 | .0320 | .0978 |
| .722 | .0274 | .0968 |
| .670 | .0256 | .0962 |
| .648 | .0256 | .0962 |
| .567 | .0232 | .0958 |
| .516 | .0172 | .0937 |
| .464 | .0118 | .0902 |
| .413 | .0078 | .0872 |
| .361 | .0058 | .0854 |
| .324 | .0058 | .0854 |
| .284 | .0054 | .0850 |
| .258 | .0046 | .0842 |
| .232 | .0024 | .0820 |
| .206 | −.0010 | .0788 |
| .180 | −.0056 | .0740 |
| .155 | −.0112 | .0686 |
| .129 | −.0180 | .0628 |
| .103 | −.0254 | .0574 |
| .077 | −.0328 | .0530 |
| .052 | −.0398 | .0498 |
| .026 | −.0440 | .0478 |
| 0 | −.0470 | .0470 |

Since the coupler is symmetric, the above values are used for both conductors and for both halfs (i.e. $+x$ and $-x$ values) of the conductors. In actuality, only one conductor need be laid out corresponding to the geometry shown in FIG. 1a, an identical copy of this board being used for the other half of the completed coupler of FIGS. 2 and 3. Measured response of the embodiment may be found in FIG. 9 of the article by applicant entitled "The Design and Construction of Broadband, High-Directivity, 90-degree Couplers Using Nonuniform Line Techniques," IEEE Transactions on Microwave Theory and Techniques, December 1966, pp. 647–656.

More recent work has indicated that noticeably improved low frequency directivity can be provided by abruptly ending the coupled region at the middle of the outer lobes in $g(u)$ (at $\pm 9\pi$ in the specific embodiment). A second coupler embodiment 41, having abruptly ended coupling regions, is shown in FIGS. 7 and 8. The coupling is identical to the above design from the center out to the middle of the last $g(u)$ lobes, followed typically by 50 ohm connecting lines 42 which lead away from the coupler centerline. A suitable miter 44 is used at the junctions proper to reduce discontinuity effects after the manner of conventional stepped coupler practice.

The only significant theoretical modification to coupling vs. frequency performance is to reduce the amplitude of the highest frequency coupling ripple, while slightly increasing some of the lower frequency ripples. Several models of this abruptly terminated design have been built employing a 45 degree angle between the centerline of the coupler and the centerline of the connecting 50 ohm stripline 42; improved directivity is exhibited over comparable tapered designs using circular bends. The amount of compensating miter 44 required is readily determinable with the aid of a broadband time-domain reflectometer. The circular bend is not ideal because the large angle between opposite conductors reduces magnetic coupling with respect to electric coupling, producing an undesired contribution of signal to the normally isolated port; the mitered junction, while also not ideal, is better than the circular bend under the loose coupled conditions present at the coupler ends.

It will be appreciated that a step in the design of virtually all modern couplers is the synthesis of a chart specifying coupling coefficient vs. distance along the coupler. The coupling vs. distance chart is the equivalent of a generic physical description of all TEM couplers having like electrical characteristics such as frequency response. Any number of couplers within the generic classification specified by the coupling vs. distance chart may be constructed simply by selecting a midband frequency (a design factor), and referring to known tables to obtain the widths and spacings of the conductors. Those skilled in the art will appreciate that other TEM conductor cross-sectional geometries can be employed to produce couplers of different geometry having like electrical characteristics. For example: W. J. Getsinger, "Coupled Rectangular Bars Between Parallel Plates," IEEE Transactions on Microwave Theory and Techniques, vol. MTT 10, pp. 65–72, January 1962; W. J. Getsinger, "A Coupled Strip-Line Configuration Using Printed-Circuit Construction That Allows Very Close Coupling," IEEE Transactions on Microwave Theory and Techniques, vol. MTT 9, pp. 535–544, November 1961; and S. B. Cohn, "Shielded Coupled-Strip Transmission Line," IRE Transactions on Microwave Theory and Techniques, vol. MTT 3, pp. 29–38, October 1955.

Of the various possible classes of tapered line coupler, the present equal ripple coupling class provides the best approximation to constant coupling over a broad bandwidth. This feature is a considerable value in various systems and instrumentation applications. That is, the equal ripple coupler provides the highest mean coupling level-bandwidth product possible for a given tightness of physical coupling in the coupled line geometry. This is of considerable practical advantage in constructing the device.

While I have described but two preferred embodiments of the present invention, it should be understood that various changes, adaptions and modifications may be made therein without departing from the spirit of the invention and the scope of the appended claims.

Having thus described my invention, I claim:

1. An apparatus having terminals A, B, C and D for TEM coupling of microwave energy of a preselected wavelength between terminals A and C and between terminals B and D and for transmission of microwave energy between terminals A and B and between terminals D and C comprising:

a first microwave conductor connected between terminals A and B having a coupling portion therebetween being symetrical about its center, said coupling portion having a cross-sectional dimension which generally increases as a function of distance from its center;

a second microwave conductor connected between terminals C and D having a coupling portion therebetween being symmetrical about its center, said coupling portion having a cross-sectional dimension which generally increases as a function of distance from its center;

said conductors being insulated one from the other and positioned in spaced relationship such that said cen-

United States Patent Office

3,528,038
Patented Sept. 8, 1970

3,528,038
TAPERED LINE DIRECTIONAL COUPLER
Carl P. Tresselt, Detroit, Mich., assignor to The Bendix Corporation, a corporation of Delaware
Continuation-in-part of application Ser. No. 574,973, Aug. 25, 1966. This application July 11, 1969, Ser. No. 843,286
Int. Cl. H01p 5/14, 3/00
U.S. Cl. 333—10
14 Claims

ABSTRACT OF THE DISCLOSURE

A backward wave coupler for microwave frequencies having a pair of tapered line conductors with corresponding sequential oblique and parallel sections.

CROSS REFERENCE TO RELATED APPLICATIONS

This application is a continuation-in-part of my copending application Ser. No. 574,973 also entitled "Tapered Line Directional Coupler" filed Aug. 25, 1966 and assigned to the assignee of this application.

This invention pertains to a tapered line directional coupled for microwave frequencies having a broad frequency bandwidth, high directivity and isolation, equal voltage ripple for the entire frequency bandwidth, and a high mean coupling-bandwidth product for a given center coupling level.

It is an object of this invention to provide, within a shielded conductor (such as provided by parallel ground planes), two TEM mode transmission lines which are mutually coupled along a substantial portion of their length. The amount of coupling between lines is gradually tapered from lose coupling at one end of coupled region to the tight coupling the center of the device and back to loose coupling in a symmetric manner. The transverse line dimensions are chosen, accordingly, to be small compared with taper length. The use of a coupled line structure symmetric about its center guarantees 90-degree relative phase lead of the coupled port with respect to the transmitted port at all frequencies. Because the device employs TEM propagation, the coupling provided is the backward-wave variety.

It is an object of this invention to provide between ground planes a first microwave member consisting of a TEM mode transmission line having terminals A and B, and superimposing a second microwave member having terminals C and D, both members being insulated from one another and from the ground planes. In such a backward-wave coupler, it is desirable to have energy couple between terminals A and C but not between A and D. Likewise, it is desirable to couple energy between terminals B and D but not between terminals B and C. This invention provides such a coupling having substantially equal voltage coupling ripples across the entire coupled frequency band and substantially zero voltage coupling at frequencies above the band with no discontinuities existing along either of the microwave members therefore resulting in substantially higher directivity than is possible with the couplers of the prior art which utilize stepped sections having discontinuities associated therewith.

It is an object to achieve the above coupling characteristics by forming two superimposed conductive members between ground planes spaced by insulation from one another and from the ground planes and having dimensions along the length thereof to provide a unique coupling relationship at all points between the members, which relationship varies along the length $u$ of the members, to provide superior properties to those couplers known to the art. This coupling relationship is found from the following function $g(u)$, which is a first-order representation of a general symmetric tapered coupler providing constant means coupling over a band-limited region:

$$g(u) = \frac{-\sin^2 u/2}{u/2}$$

where $$g(u) = \frac{d}{du} \ln Z_{oe}(u)$$

and $u$ is the length along the coupler strips with $u=0$ being located at the center of the design. $Z_{oe}(u)$ is the even mode impedance at any selected point along the coupled lines, which can be determined explicitly from the above by taking inverse of the operations indicated:

$$Z_{oe}(u) = \exp[\int g(u) du]$$

A set of weighting coefficients generated from prior art equal-ripple stepped coupler designs is used to adjust the mean coupling level, bandwidth, and coupling ripple tolerance of the general tapered model to essentially conform to that of the stepped prototype chosen. Thus $$M_i = \frac{(2i-1)}{2} \ln \frac{Z_c + 1 - i}{Z_c - i}$$

where $M_i$ is the $i$th weighting factor which is to multiply the ordinates of $g(u)$ from $-2i\pi \leq u \leq 2(i-1)\pi$ and $2(i-1)\pi \leq u \leq 2i\pi$; the integers $i$ are successive integers running from $$1 \leq i \leq \frac{n+1}{2}$$

when $n$ is the order of the prior art stepped coupler and is equal to the number of quarter wave sections in the coupler; $Z_c$ is the known even-mode impedance for the center quarter wavelength section of the prior art stepped coupler; $Z_{c-1}$ is the even-mode impedance for the quarter wavelength section next to the prior art stepped coupled center section; and $u$ is the distance along the coupler. The impedances, $Z$, are available from tables in the art.

FIG. 4 shows a weighted $g(u)$ function. The even-mode impedance of the coupler can be found by integrating the weighted $g(u)$ function and taking the anti-log:

$$Z_{oe}(u) = \exp\left[\int_{-(n+1)\pi}^{+(n+1)\pi} M_i g(u) du\right]$$

$Z_{oe}(u)$ is then substituted in the relationship $$k(u) = \frac{Z_{oe}(u)^2 - 1}{Z_{oe}(u)^2 + 1}$$

to find $k(u)$, the coupling between the two microwave members vs. distance. The relationship that $\sqrt{Z_{oe} \cdot Z_{oo}} = 1$ must be satisfied throughout the length of the coupler to assure high directivity. $Z_{oe}$ is the even-mode characteristic impedance of the coupled lines and $Z_{oo}$ is the odd-mode characteristic impedance. The coupling $k$ is plotted vs. distance along the coupler as shown in FIG. 5. Once the curve of FIG. 5 is obtained, the design of the coupler follows readily from design information in the art.

These and other objects and advantages will become apparent when a preferred embodiment of this invention in three-layer dielectric stripline is described in connection with the drawings in which:

FIG. 1a is a plan view of one portion of a first directional coupler according to this invention.

FIG. 1b is a detail view of one portion of the coupler shown in FIG. 1a.

FIG. 3 is an exploded view of the directional coupler of FIG. 1.

FIGS. 4 and 5 illustrate graphs used in design steps in the determination of the configuration of the coupler of FIGS. 1–3.

FIG. 6 is an approximate operating curve of the embodiment of FIGS. 1–3 when the overall coupled region length is 3.23 inches in polyolefin stripline.

FIG. 7 is a plan view of one portion of a second directional coupler according to this invention.

FIG. 8 is a detailed view of a portion of the conductors used in the coupler of FIG. 7.

Figure 1:
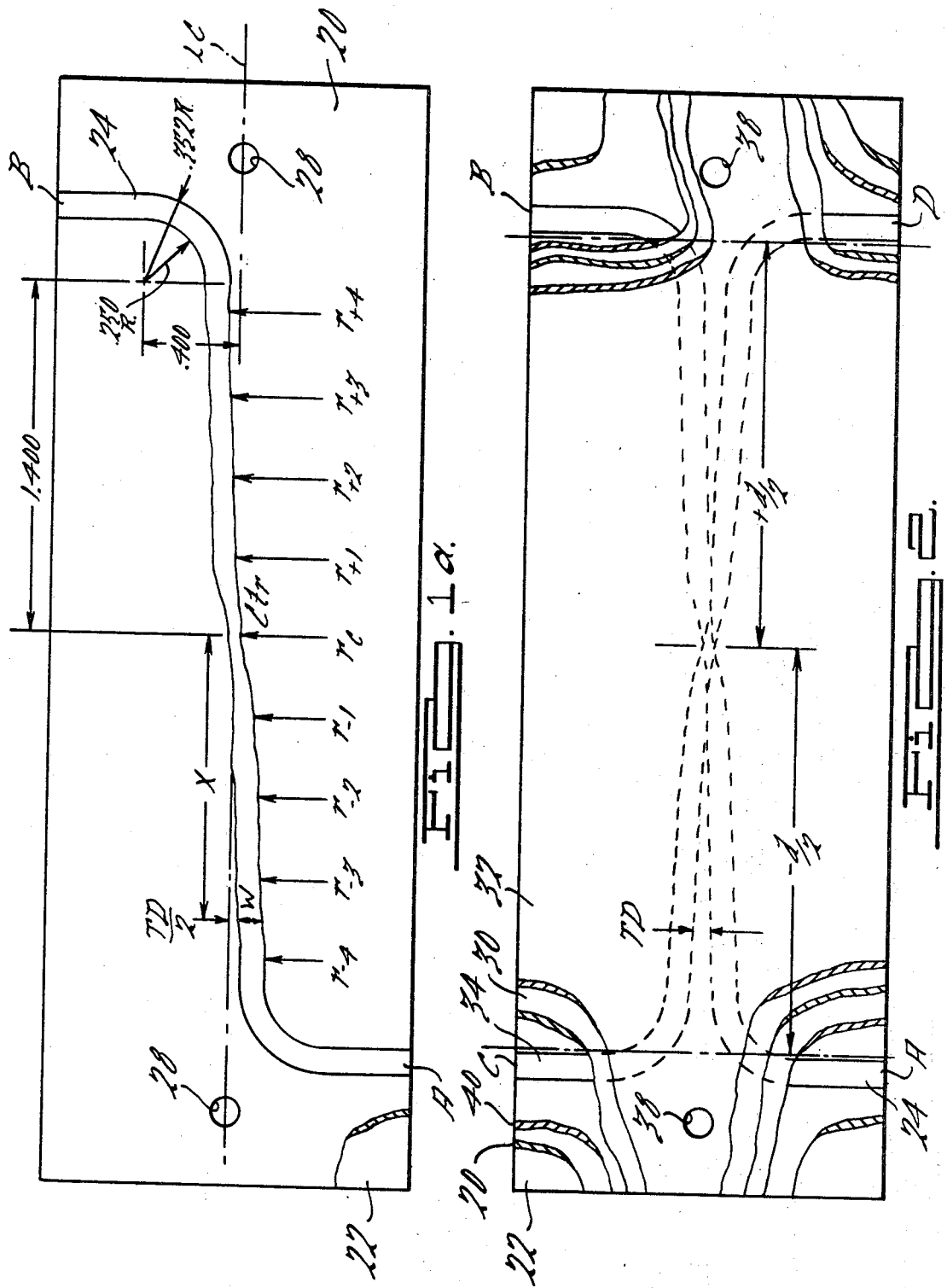

FIG. 1 shows one of the striplines of a directional coupler of this invention. A polyolefin slab 20 has a copper foil ground plane 22 bonded to the lower side thereof and a copper foil microwave stripline 24 bonded to the other side thereof. In this embodiment, slab 20 is 59.7 mils thick and foil 22 and stripline 24 are 1.4 mils thick, with thickness being the dimension into the drawing. The stripline member 24 has terminals A and B and exhibits in this specific example, nine short regions in which line width W and transverse dimension TD from the longitudinal centerline LC do not change with respect to coupler length, i.e. the stripline member is parallel to the longitudinal centerline LC at these nine regions. This construction can be more clearly seen with reference to FIG. 1b in which a portion of the conductor 24 of FIG. 1a is shown with the transverse dimensions of the conductor 24 greatly exaggerated to better illustrate its configuration. Referring now to FIG. 1b, it will be appreciated that the conductor 24 is nominally parallel to the longitudinal centerline at the center region of the conductor at $r_c$ and at eight other flanking short regions designated by the notation "$r$." These nominally parallel regions are connected by oblique sections as shown in FIG. 1b. The regions $r_{-1}$, $r_{-2}$, $r_{-3}$, and $r_{-4}$ correspond in dimension and position from the longitudinal centerline to regions $r_{+1}$, $r_{+2}$, $r_{+3}$, $r_{+4}$, respectively, being different only in that they are below the longitudinal centerline rather than above it.

These nine regions of substantially uniform coupling vs. distance correspond to the regions of uniform coupling in the prototype of FIG. 5 at $u=0$, $\pm 2\pi$, $\pm 4\pi$, etc., which in the present embodiment was derived from a ninth order prior art stepped coupler. The nine regions $r$ of inflection correspond to the zero points on the $g(u)$ function, shown in FIG. 4. The spacing between adjacent regions or inflections $r$ is 0.323 inch for an overall length $d=3.23$ inches. Total coupled length $d$ runs from $-d/2$ to $+d/2$ representing the terminations of the coupled portions which are located in the vicinity of the inner edges of the stripped conductors in the regions where the conductors are perpendicular to the longitudinal axis of the coupled sections.

In view of the above explanation with respect to FIGS. 1a and 1b, it will be appreciated that a coupler according to this invention is characterized by having a first section of a first slope connected to and blended with a second oblique section having a greater slope. The second section is in turn connected to and blended with a third section of lesser slope than the slope of the second oblique section. First and third sections are spaced apart at a longitudinal distance equal to one-quarter of the midband wavelength. In effect, the construction herein described provides a tapered line coupler having undulations longitudinally spaced at one-quarter of the wavelength of the midband frequency. In the preferred embodiment, the first and third sections are parallel to the longitudinal centerline between the couplers.

Since the coupling required at the end of the device is zero, as indicated in FIG. 5, circular bends are provided at the ends of the taper to provide gradual decoupling. As will be apparent in view of a later embodiment, more abrupt decoupling may also be utilized.

Holes 28 are formed in slab 20 for insertion of a dowel pin therethrough which is helpful during assembly.

Figure 2:
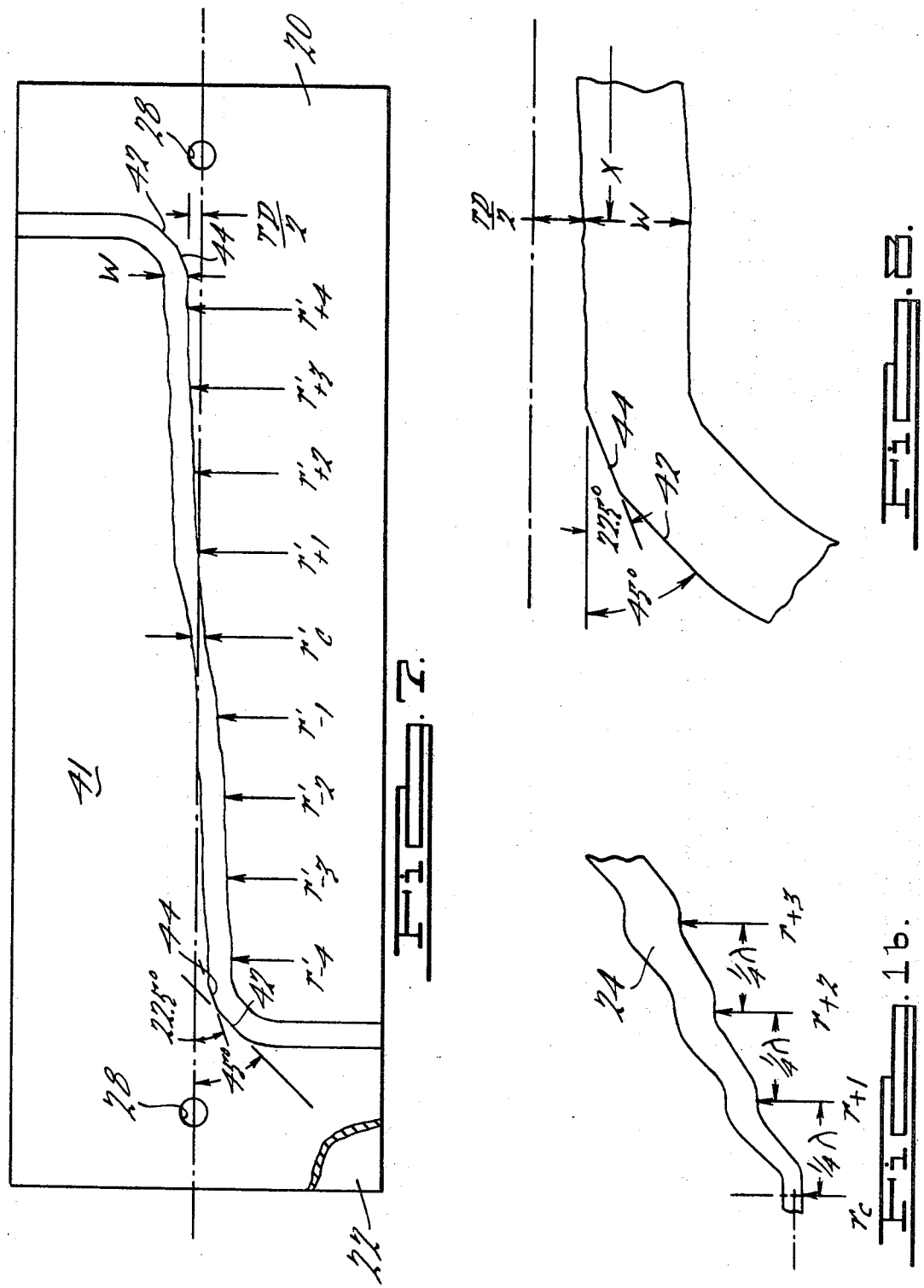
FIG. 2 is a broken away plan view of the directional coupler of FIG. 1.

FIG. 2 shows a cutaway plan view of a completed directional coupler and as can be seen in the figure, the coupler comprises a second slab 30 of polyolefin material and having a copper foil 32 bonded to the upper side thereof for a ground plane, and a copper foil microwave stripline 34 bonded to the other side thereof which stripline is identical to the stripline 24 and has terminals C and D. Slab 30 has formed therein holes 38 which are in alignment with holes 28 of the slab 20. A center polyolefin spacer shim 40 is placed between the copper foil stripline members 24 and 34 in the assembled coupler and spacer shim 40 and its relationship to the coupler is seen best in the exploded view of FIG. 3. Shim 40 in this embodiment is 10 mils thick, with thickness being the vertical dimension.

The two slabs 20 and 30 are identically prepared by methods well known in the art and have identical stripline patterns 24 and 34 thereon. When slab 30 is turned over and facing slab 20, the terminals C and D will be opposite to terminals A and B, respectively, as shown in FIG. 2. In the operation of the coupler, signals applied to terminal A will be coupled to terminal C but not to terminal D and signals applied to terminal C will be coupled to terminal A but not to terminal B. In like manner, signals applied to terminal B will be coupled to terminal D and not to terminal C while signals applied to terminal D will be coupled to terminal B but not to terminal A. This is a standard backward-wave coupling sequence. This invention improves over prior art couplers by providing better directivity due to the absence of discontinuities between regions in the coupler and the design procedures to obtain such tapered portions between the regions that will now be described.

In the design of the embodiment of FIGS. 1–3, weighting coefficients are determined. These coefficients are determined by using the following relationships:

$$M_1 = \tfrac{1}{2} \ln \frac{Z_c}{Z_{c-1}}$$

$$M_2 = \tfrac{3}{2} \ln \frac{Z_{c-1}}{Z_{c-2}}$$

$$M_3 = \tfrac{5}{2} \ln \frac{Z_{c-2}}{Z_{c-3}}$$

$$\vdots \quad \vdots \quad \vdots$$

$$M_{\frac{n+1}{2}} = \frac{n}{2} \ln \frac{Z_{c-\left(\frac{n-1}{2}\right)}}{Z_o}$$

where $Z_c$ is the known even-mode impedance of the center quarter wavelength of a prior art stepped coupler, $Z_{c-1}$ is the known even-mode impedance of the first quarter wavelength sections on either side of the center section $Z_c$ and $Z_{c-2}$ is the known even-mode impedance of each of the quarter wavelength sections on either side of the sections $Z_{c-1}$ and so on. The even-mode impedances for a variety of mean coupling levels and ripple tolerances for $3 \leq n \leq 9$ are known to the art and disclosed in E. G. Cristal, R. Young, "Theory and Tables of Optimum Symmetrical TEM Mode Coupled Transmission Line Directional Couplers," IEEE Transactions on Microwave Theory and Techniques, September 1965, pp. 545–558.

The structure is symmetric about the center section of the coupler. $n$ is the order of the corresponding stepped coupler and is always odd. The higher the order of $n$, the broader the bandwidth of the coupler. The stripline structure shown in FIG. 1 was derived, for example, from a ninth-order $-8.34+0.3$ db prior art coupler found in the Cristal and Young reference with $$Z_c = 2.25315, \quad Z_{c-1} = 1.35771$$

$$Z_{c-2} = 1.16469, \quad Z_{c-3} = 1.07697$$

$$Z_{c-4} = 1.03134$$

$Z_o$ is the characteristic impedance of the lines connectters are adjacent each other and such that said coupling portions are positioned a substantially equal distance from a predetermined line between said coupling portions;

each of said coupling portions including a plurality of undulations being longitudinally spaced one-quarter of said wavelength and being transversely spaced as a function of longitudinal distance from said centers, said undulations being connected by oblique coupling portion sections.

2. Apparatus comprising:

ground plane means;

a first microwave member having terminals A and B;

a second microwave member having terminals C and D related to said first member so as to couple energy from terminal A to C but not from A to D, and to couple energy from B to D but not from B to C;

insulative means for insulating said first microwave member from said second microwave member and from said ground plane means;

said members having means for providing continuous coupling along the coupled length thereof;

said members having tapered portions with cross-sectional dimensions and spacing therebetween providing coupling along the length of the tapered portions defined by a coupling coefficient vs. distance along the length of the tapered portions curve, with distance being plotted along the abscissa, wherein one horizontal level on the curve is connected to the next horizontal level by a generally oblique line with said oblique line being in a period commensurate to ¼λ, where λ is the wavelength of a wave of a frequency at the center of the coupled band, thereby producing substantially equal voltage coupling ripples over the entire coupled frequency band.

3. An apparatus having terminals A, B, C and D for TEM coupling of microwave energy of a preselected wavelength between terminals A and C and between terminals B and D and for transmission of microwave energy between terminals A and B and between terminals D and C comprising:

a first microwave conductor connected between terminals A and B having a coupling portion therebetween being symmetrical about its center, said coupling portion having a cross-sectional dimension which generally increases as a function of distance from its center;

a second microwave conductor connected between terminals C and D having a coupling portion therebetween which is symmetrical to said first coupling portion; and ground plane means for said members being insulated therefrom;

said conductors being insulated one from the other and positioned in spaced relationship such that said centers are adjacent each other and such that said coupling portions are positioned a substantially equal distance from a predetermined line between said coupling portions;

each of said coupling portions including a first section having a first predetermined slope with respect to said line between said coupling portions, a second section connected to and adjacent said first section having a predetermined oblique slope with respect to said line between said coupling portions which is greater than said first slope, and a third section connected to and adjacent said second section having a predetermined slope with respect to said line between said coupling portions which is less than said oblique slope, said first and third sections being longitudinally spaced one-quarter of said wavelength, said sections being transversely spaced as a function of longitudinal distance from said centers such that said sections nearest said center are in closest proximity to said line.

4. The apparatus of claim 3 wherein said conductors are gradually curved at the terminations of said coupling portions to provide gradual decoupling at said terminations.

5. The apparatus of claim 3 wherein said couplers have a configuration at the terminations of said coupling portions which provide abrupt decoupling at said terminations.

6. The apparatus of claim 5 wherein said couplers include a miter at said terminations to reduce discontinuities at said terminations.

7. An apparatus for coupling microwave energy over a preselected frequency band comprising:

a first microwave TEM conductor having terminals A and B, a coupling portion therebetween and a coupling portion center;

a second microwave TEM conductor being insulated from said first conductor having terminals C and D, a coupling portion therebetween and a coupling portion center being placed adjacent said first center for backward wave coupling between said conductors; and ground plane means substantially encompassing said conductors being insulated therefrom;

said coupling portions generally being gradually tapered in cross section and in spacing in two directions outwardly from said centers such that said centers are nearest each other and have the smallest cross sections thereby providing greatest coupling at said centers and lesser coupling away from said centers, the cross-sectional dimensions of said conductors and the spacing therebetween being substantially less than the overall length of said portions;

said tapered portions having short corresponding regions which are nominally parallel, one of said regions being at said centers and the remaining of said regions equally disposed from one another along said conductors being spaced by λ/4 and where λ is the wavelength of the mid frequency of said band thereby providing coupling having substantially equal ripple over said band.

8. An apparatus having terminals A, B, C and D for TEM coupling of microwave energy of a preselected bandwidth between terminals A and C and between D and B and for transmission of microwave energy between terminals A and B and between D and C comprising:

a first microwave member connected between terminals A and B having a coupling portion therebetween being symmetrical about its center, said coupling portion having a cross-sectional dimension which generally increases as a function of distance from its center;

a second microwave member connected between terminals C and D having a coupling portion therebetween being symmetrical about its center, said coupling portion have a cross-sectional dimension which generally increases as a function of distance from its center; and ground plane means for said members being insulated therefrom;

said members being insulated one from the other and positioned in spaced relationship such that said centers are adjacent each other and such that said coupling portions are positioned substantially equidistant from a predetermined line between said coupling portions;

said coupling portions being nominally parallel to said line at said centers and at a plurality of corresponding sections which are longitudinally spaced from said centers at intervals substantially equal to quarter wavelength of the mid frequency of said bandwidth and the remainder of said coupling portions being transversely spaced from said line as a function of longitudinal distance from said centers such that the cross sections nearest said centers are in closest proximity to said line.

9. The apparatus of claim 8 with
each of said microwave members being stripline members;
said stripline members being formed of a conductive material and being placed on one side of a slab of insulation material;
said slabs being placed together with the sides having the conductive stripline facing each other;
an insulative shim being placed between said slabs to provide a predetermined insulation between said conductive stripline members;
the outer sides of the assembled insulative slabs having a conductive coating to form ground planes.

10. The coupling apparatus of claim 8 wherein said first and said second members have a configuration by substitution of the known impedances of equal ripple, symmetric stepped coupler of $n$ sections into the following relationships:

$$M_1 = \tfrac{1}{2} \ln \frac{Z_c}{Z_{c-1}}$$

$$M_2 = \tfrac{1}{2} \ln \frac{Z_{c-1}}{Z_{c-2}}$$

$$M_3 = \tfrac{1}{2} \ln \frac{Z_{c-2}}{Z_{c-3}}$$

$$\vdots$$

$$M_{\frac{n+1}{2}} = \tfrac{n}{2} \ln \frac{Z_{c-\left(\frac{n-1}{2}\right)}}{Z_c}$$

where $Z_c, Z_{c-1}, Z_{c-2}, Z_{c-3}, \ldots$ are the known even-mode impedances of successive quarter wave length sections of a corresponding stepped coupler with $Z_c$ being the impedance of the center section and $n$ is the order of the corresponding stepped coupler; application of the M numbers so found to the ordinates of the function $$g(u) = \frac{-\sin^2 u/2}{u/2}$$

with $M_1$ multiplying $g(u)$ in the interval $-2\pi < u < 2\pi$, $M_2$ multiplying $g(u)$ in the intervals $-4\pi \leq u \leq -2\pi$ and $2\pi \leq u \leq 4\pi$, $M_3$ multiplying $g(u)$ in the intervals $$-6\pi \leq u \leq -\text{D}\pi$$

and $4\pi \leq u \leq 6\pi$ and so forth until $$M_{\frac{n+1}{1}}$$

has been applied to $g(u)$ over the ranges $$-(n+1)\pi \leq u \leq -(n-1)\pi$$

and $(n-1)\pi \leq u \leq (n+1)\pi$; integration of the weighted function $g(u)$ with respect to $u$ over the limits from $-(n+1)\pi$ to $(n+1)\pi$ producing $\ln Z_{oe}(u)$; the taking of the anti-log (natural-base) of the resulting integrated function producing $Z_{oe}(u)$; substitution of $Z_{oe}(u)$ so found in the relationship $$k(u) = \frac{Z_{oe}(u)^2 - 1}{Z_{oe}(u)^2 + 1}$$

to find coupling $k$ for each point along the coupling portions; the actual physical length $d$ of the coupling portions being determined from relationship $$d = \frac{(n+1)v}{4f_o}$$

where $v$ is TEM mode velocity of propagation in the coupling portions of $f_c$ is the mid frequency of the coupling band; the spacing and dimensions of the geometry for each point of the coupling portions being determinable from the above.

11. The apparatus of claim 10 wherein said members gradually curve in the regions corresponding to $$-(n+1)\pi \leq u \leq -n\pi$$

and n $n\pi \leq u \leq (n+1)\pi$ to provide gradual decoupling at said terminations.

12. The apparatus of claim 11 wherein said terminations are circular arcs.

13. The apparatus of claim 10 wherein said coupled portions have a configuration at the points corresponding to $u = +n\pi$ which provide abrupt decoupling at the termination.

14. The apparatus of claim 13 wherein said terminations include a miter to reduce discontinuities at said terminations.

References Cited

UNITED STATES PATENTS

| | | | |
|---|---|---|---|
| 2,934,719 | 4/1960 | Kyhl | 333—10 |
| 3,358,248 | 12/1967 | Saad | 333—10 |
| 3,390,356 | 6/1968 | Ryals et al. | 333—10 X |

HERMAN KARL SAALBACH, Primary Examiner

S. CHATMON, Jr., Assistant Examiner

U.S. Cl. X.R.

33—34, 84

UNITED STATES PATENT OFFICE
CERTIFICATE OF CORRECTION

Patent No. 3,528,038                    Dated   September 8, 1970

Inventor(s) Carl P. Tresselt

It is certified that error appears in the above-identified patent and that said Letters Patent are hereby corrected as shown below:

Column 4, Line 68:   "+" should be "$\pm$"

Claim 10, Line 2:   - - - determined - - - should appear after "configuration"

Claim 10, Line 46:   "-D$\pi$" should be "-4$\pi$"

Signed and sealed this 13th day of July 1971.

(SEAL)
Attest:

EDWARD M. FLETCHER, JR.               WILLIAM E. SCHUYLER, JR.
Attesting Officer                     Commissioner of Patents